United States Patent
Gossain

(10) Patent No.: US 9,549,020 B2
(45) Date of Patent: Jan. 17, 2017

(54) GROUP COORDINATOR DEVICE SELECTION

(71) Applicant: Sonos, Inc., Santa Barbara, CA (US)

(72) Inventor: Hrishikesh Gossain, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 334 days.

(21) Appl. No.: 14/041,989

(22) Filed: Sep. 30, 2013

(65) Prior Publication Data

US 2014/0181202 A1   Jun. 26, 2014

(51) Int. Cl.
*G06F 15/16* (2006.01)
*H04L 29/08* (2006.01)
*H04L 29/06* (2006.01)

(52) U.S. Cl.
CPC .......... *H04L 67/10* (2013.01); *H04L 65/4084* (2013.01); *H04L 67/325* (2013.01)

(58) Field of Classification Search
CPC .. H04L 67/10; H04L 43/0894; H04L 43/0829; H04L 43/062; H04L 67/325; H04L 65/4084; H04R 29/00
USPC ............................... 709/204, 208, 231, 232
See application file for complete search history.

(56) References Cited

U.S. PATENT DOCUMENTS

| | | | |
|---|---|---|---|
| 4,296,278 A | 10/1981 | Cullison et al. |
| 4,816,989 A | 3/1989 | Finn et al. |
| 5,182,552 A | 1/1993 | Paynting |
| 5,406,634 A | 4/1995 | Anderson et al. |
| 5,440,644 A | 8/1995 | Farinelli et al. |
| 5,467,342 A | 11/1995 | Logston et al. |
| 5,491,839 A | 2/1996 | Schotz |
| 5,553,222 A | 9/1996 | Milne et al. |
| 5,668,884 A | 9/1997 | Clair, Jr. et al. |
| 5,673,323 A | 9/1997 | Schotz et al. |

(Continued)

FOREIGN PATENT DOCUMENTS

| | | |
|---|---|---|
| EP | 0251584 A2 | 1/1988 |
| EP | 0672985 A1 | 9/1995 |

(Continued)

OTHER PUBLICATIONS

AudioTron Setup Guide, Version 3.0, Voyetra Turtle Beach, Inc., May 2002, 38 pages.

(Continued)

*Primary Examiner* — Ario Etienne
*Assistant Examiner* — Sahera Halim
(74) *Attorney, Agent, or Firm* — McDonnell Boehnen Hulbert & Berghoff LLP

(57) ABSTRACT

Embodiments described herein involve selecting a group coordinator device for a group of media devices of a networked media playback system. One of the media devices in the networked media playback system may be a group coordinator device configured to provide media content and playback timing information to other media devices in the group for synchronized playback of media content. Selection of the group coordinator device may involve performing an evaluation of one or more parameters associated with each of the one or more media devices in the media playback system, determining that a particular media device is the most suitable group coordinator devices, and causing the particular media device to become the group coordinator device.

20 Claims, 13 Drawing Sheets

(56) References Cited

U.S. PATENT DOCUMENTS

| | | |
|---|---|---|
| 5,815,689 A | 9/1998 | Shaw et al. |
| 5,867,691 A | 2/1999 | Shiraishi |
| 5,875,354 A | 2/1999 | Charlton et al. |
| 5,887,143 A | 3/1999 | Saito et al. |
| 5,923,902 A | 7/1999 | Inagaki |
| 5,946,343 A | 8/1999 | Schotz et al. |
| 6,009,457 A | 12/1999 | Moller |
| 6,026,150 A | 2/2000 | Frank et al. |
| 6,031,818 A | 2/2000 | Lo et al. |
| 6,128,318 A | 10/2000 | Sato |
| 6,157,957 A | 12/2000 | Berthaud |
| 6,175,872 B1 | 1/2001 | Neumann et al. |
| 6,185,737 B1 | 2/2001 | Northcutt et al. |
| 6,195,436 B1 | 2/2001 | Scibora et al. |
| 6,199,169 B1 | 3/2001 | Voth |
| 6,256,554 B1 | 7/2001 | DiLorenzo |
| 6,308,207 B1 | 10/2001 | Tseng et al. |
| 6,324,586 B1 | 11/2001 | Johnson |
| 6,332,147 B1 | 12/2001 | Moran et al. |
| 6,351,821 B1 | 2/2002 | Voth |
| 6,404,811 B1 | 6/2002 | Cvetko et al. |
| 6,430,353 B1 | 8/2002 | Honda et al. |
| 6,487,296 B1 | 11/2002 | Allen et al. |
| 6,522,886 B1 | 2/2003 | Youngs et al. |
| 6,526,325 B1 | 2/2003 | Sussman et al. |
| 6,587,127 B1 | 7/2003 | Leeke et al. |
| 6,598,172 B1 | 7/2003 | VanDeusen et al. |
| 6,611,537 B1 | 8/2003 | Edens et al. |
| 6,631,410 B1 | 10/2003 | Kowalski et al. |
| 6,674,803 B1 | 1/2004 | Kesselring |
| 6,757,517 B2 | 6/2004 | Chang |
| 6,778,869 B2 | 8/2004 | Champion |
| 6,826,283 B1 | 11/2004 | Wheeler et al. |
| 6,836,788 B2 | 12/2004 | Kim et al. |
| 6,898,642 B2 | 5/2005 | Chafle et al. |
| 6,912,610 B2 | 6/2005 | Spencer |
| 6,920,373 B2 | 7/2005 | Xi et al. |
| 6,934,766 B1 | 8/2005 | Russell |
| 6,985,694 B1 | 1/2006 | De Bonet et al. |
| 7,007,106 B1 | 2/2006 | Flood et al. |
| 7,020,791 B1 | 3/2006 | Aweya et al. |
| 7,043,651 B2 | 5/2006 | Aweya et al. |
| 7,047,308 B2 | 5/2006 | Deshpande |
| 7,115,017 B1 | 10/2006 | Laursen et al. |
| 7,130,608 B2 | 10/2006 | Hollstrom et al. |
| 7,130,616 B2 | 10/2006 | Janik |
| 7,143,939 B2 | 12/2006 | Henzerling |
| 7,162,315 B2 | 1/2007 | Gilbert |
| 7,185,090 B2 | 2/2007 | Kowalski et al. |
| 7,187,947 B1 | 3/2007 | White et al. |
| 7,206,367 B1 | 4/2007 | Moore |
| 7,209,795 B2 | 4/2007 | Sullivan et al. |
| 7,218,708 B2 | 5/2007 | Berezowski et al. |
| 7,236,773 B2 | 6/2007 | Thomas |
| 7,312,785 B2 | 12/2007 | Tsuk et al. |
| 7,324,857 B2 | 1/2008 | Goddard |
| 7,333,519 B2 | 2/2008 | Sullivan et al. |
| 7,372,846 B2 | 5/2008 | Zwack |
| 7,392,102 B2 | 6/2008 | Sullivan et al. |
| 7,483,538 B2 | 1/2009 | McCarty et al. |
| 7,571,014 B1 | 8/2009 | Lambourne et al. |
| 7,643,894 B2 | 1/2010 | Braithwaite et al. |
| 7,657,910 B1 | 2/2010 | McAulay et al. |
| 7,668,990 B2 | 2/2010 | Krzyzanowski et al. |
| 7,675,943 B2 | 3/2010 | Mosig et al. |
| 7,720,096 B2 | 5/2010 | Klemets |
| 7,742,740 B2 | 6/2010 | Goldberg et al. |
| 7,853,341 B2 | 12/2010 | McCarty et al. |
| 7,934,239 B1 | 4/2011 | Dagman |
| 8,014,423 B2 | 9/2011 | Thaler et al. |
| 8,045,952 B2 | 10/2011 | Qureshey et al. |
| 8,050,652 B2 | 11/2011 | Qureshey et al. |
| 8,074,253 B1 | 12/2011 | Nathan |
| 8,086,752 B2 | 12/2011 | Millington et al. |
| 8,090,317 B2 | 1/2012 | Burge et al. |
| 8,103,009 B2 | 1/2012 | McCarty et al. |
| 8,131,390 B2 | 3/2012 | Braithwaite et al. |
| 8,214,447 B2 * | 7/2012 | Deslippe ............... H04L 67/125 370/346 |
| 8,234,395 B2 | 7/2012 | Millington |
| 8,290,603 B1 | 10/2012 | Lambourne |
| 8,370,678 B2 | 2/2013 | Millington et al. |
| 8,423,659 B2 | 4/2013 | Millington |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0065926 A1 | 5/2002 | Hackney et al. |
| 2002/0073228 A1 | 6/2002 | Cognet et al. |
| 2002/0090914 A1 | 7/2002 | Kang et al. |
| 2002/0093478 A1 | 7/2002 | Yeh |
| 2002/0112244 A1 | 8/2002 | Liou et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2003/0020763 A1 | 1/2003 | Mayer, III et al. |
| 2003/0023741 A1 | 1/2003 | Tomassetti et al. |
| 2003/0035444 A1 | 2/2003 | Zwack |
| 2003/0041173 A1 | 2/2003 | Hoyle |
| 2003/0041174 A1 | 2/2003 | Wen et al. |
| 2003/0066094 A1 | 4/2003 | Van Der Schaar et al. |
| 2003/0099212 A1 | 5/2003 | Anjum et al. |
| 2003/0099221 A1 | 5/2003 | Rhee |
| 2003/0126211 A1 | 7/2003 | Anttila et al. |
| 2003/0157951 A1 | 8/2003 | Hasty |
| 2003/0195964 A1 | 10/2003 | Mane |
| 2003/0198257 A1 | 10/2003 | Sullivan et al. |
| 2003/0210796 A1 | 11/2003 | McCarty et al. |
| 2003/0231871 A1 | 12/2003 | Ushimaru |
| 2004/0001484 A1 | 1/2004 | Ozguner |
| 2004/0001591 A1 | 1/2004 | Mani et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0027166 A1 | 2/2004 | Mangum et al. |
| 2004/0131192 A1 | 7/2004 | Metcalf |
| 2004/0170383 A1 | 9/2004 | Mazur |
| 2004/0203378 A1 | 10/2004 | Powers |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2005/0010691 A1 | 1/2005 | Oyadomari et al. |
| 2005/0013394 A1 | 1/2005 | Rausch et al. |
| 2005/0058149 A1 | 3/2005 | Howe |
| 2005/0081213 A1 | 4/2005 | Suzuoki et al. |
| 2005/0114538 A1 | 5/2005 | Rose |
| 2005/0177643 A1 | 8/2005 | Xu |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2007/0038999 A1 | 2/2007 | Millington et al. |
| 2007/0054680 A1 | 3/2007 | Mo et al. |
| 2007/0142022 A1 | 6/2007 | Madonna et al. |
| 2007/0142944 A1 | 6/2007 | Goldberg et al. |
| 2007/0271388 A1 | 11/2007 | Bowra et al. |
| 2008/0112364 A1 * | 5/2008 | Kwon ................... H04W 84/20 370/331 |
| 2008/0120429 A1 | 5/2008 | Millington et al. |
| 2008/0144861 A1 | 6/2008 | Melanson et al. |
| 2009/0157905 A1 | 6/2009 | Davis |

(56) References Cited

U.S. PATENT DOCUMENTS

| | | | |
|---|---|---|---|
| 2009/0171487 A1* | 7/2009 | Wilhelm | G11B 27/105 700/94 |
| 2009/0228919 A1 | 9/2009 | Zott et al. | |
| 2012/0029671 A1 | 2/2012 | Millington et al. | |

FOREIGN PATENT DOCUMENTS

| | | |
|---|---|---|
| EP | 1111527 A2 | 6/2001 |
| WO | 9525313 A1 | 9/1995 |
| WO | 9961985 A1 | 12/1999 |
| WO | 0153994 | 7/2001 |
| WO | 2005013047 A2 | 2/2005 |
| WO | 2012137190 A1 | 10/2012 |

OTHER PUBLICATIONS

"Bluetooth. "Specification of the Bluetooth System: The ad hoc Scatternet for affordable and highly functional wireless connectivity" Core, Version 1.0 A, Jul. 26, 1999, 1068 pages".

"Bluetooth. "Specification of the Bluetooth System: Wireless connections made easy" Core, Version 1.0 B, 1 Dec. 1999, 1076 pages".

"Dell, Inc. "Dell Digital Audio Receiver: Reference Guide" Jun. 2000, 70 pages".

"Dell, Inc. "Start Here" Jun. 2000, 2 pages".

"Jones, Stephen. "Dell Digital Audio Receiver: Digital upgrade for your analog stereo" Analog Stereo. Jun. 24, 2000 <http://www.reviewsonline.com/articles/961906864.htm> retrieved Jun. 18, 2014, 2 pages".

"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".

"Palm, Inc. "Handbook for the Palm VII Handheld" May 2000, 311 pages".

"Presentations at WinHEC 2000" May 2000, 138 pages.

Akyildiz I.F., et al., "Multimedia Group Synchronization Protocols for Integrated Services Networks," IEEE Journal on Selected Areas in Communications, 1996, vol. 14 (1), pp. 162-173.

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Benslimane A., "A Multimedia Synchronization Protocol for Multicast Groups," Proceedings of the 26th Euromicro Conference, 2000, vol. 1, pp. 456-463.

Biersack E., et al., "Intra- and Inter-Stream Synchronisation for Stored Multimedia Streams," IEEE International Conference on Multimedia Computing and Systems, 1996, pp. 372-381.

Bretl W.E., et al., MPEG2 Tutorial [online], 2000 [retrieved on Jan. 13, 2009] Retrieved from the Internet< http://www.bretl.com/mpeghtml/MPEGindex.htm>, pp. 1-23.

Huang C.M., et al., "A Synchronization Infrastructure for Multicast Multimedia at the Presentation Layer," IEEE Transactions on Consumer Electronics, 1997, vol. 43 (3), pp. 370-380.

Ishibashi Y., "A Group Synchronization Mechanism for Live Media in Multicast Communications," IEEE Global Telecommunications Conference, 1997, vol. 2, pp. 746-752.

Ishibashi Y., "A Group Synchronization Mechanism for Stored Media in Multicast Communications," IEEE Information Revolution and Communications, 1997, vol. 2, pp. 692-700.

Jo J., et al., "Synchronized One-to-many Media Streaming with Adaptive Playout Control," Proceedings of SPIE, 2002, vol. 4861, pp. 71-82.

Mills D.L., "Network Time Protocol (Version 3) Specification, Implementation and Analysis," Network Working Group, Mar. 1992, <http://www.ietf.org/rfc/rfc1305.txt>.

Mills D.L., "Precision Synchronization of Computer Network Clocks," ACM SIGCOMM Computer Communication Review, 1994, vol. 24 (2), pp. 28-43.

Motorola., "Simplefi, Wireless Digital Audio Receiver, Installation and User Guide", Dec. 31, 2001.

Park S., et al., "Group Synchronization in MultiCast Media Communications," Proceedings of the 5th Research on Multicast Technology Workshop, 2003.

"Polycom Conference Composer manual: copyright 2001".

PRISMIQ; Inc., "PRISMIQ Media Player User Guide", 2003, 44 pages.

Rothermel K., et al., "An Adaptive Stream Synchronization Protocol," 5th International Workshop on Network and Operating System Support for Digital Audio and Video, 1995.

Schulzrinne H., et al., "RTP: A Transport Protocol for Real-Time Applications, RFC 3550," Network Working Group, 2003, pp. 1-89.

The MPEG-2 Transport Stream. Retrieved from the Internet< URL: http://www.coolstf.com/mpeg/#ts>.

"UPnP; "Universal Plug and Play Device Architecture"; Jun. 8, 2000; version 1.0; Microsoft Corporation; pp. 1-54".

"Yamaha DME 32 manual: copyright 2001".

Co-pending U.S. Appl. No. 13/538,675, filed Jun. 29, 2012.

* cited by examiner

GROUP COORDINATOR DEVICE SELECTION

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud across multiple zone players in synchrony. The Sonos system can be controlled by software applications running on network capable mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
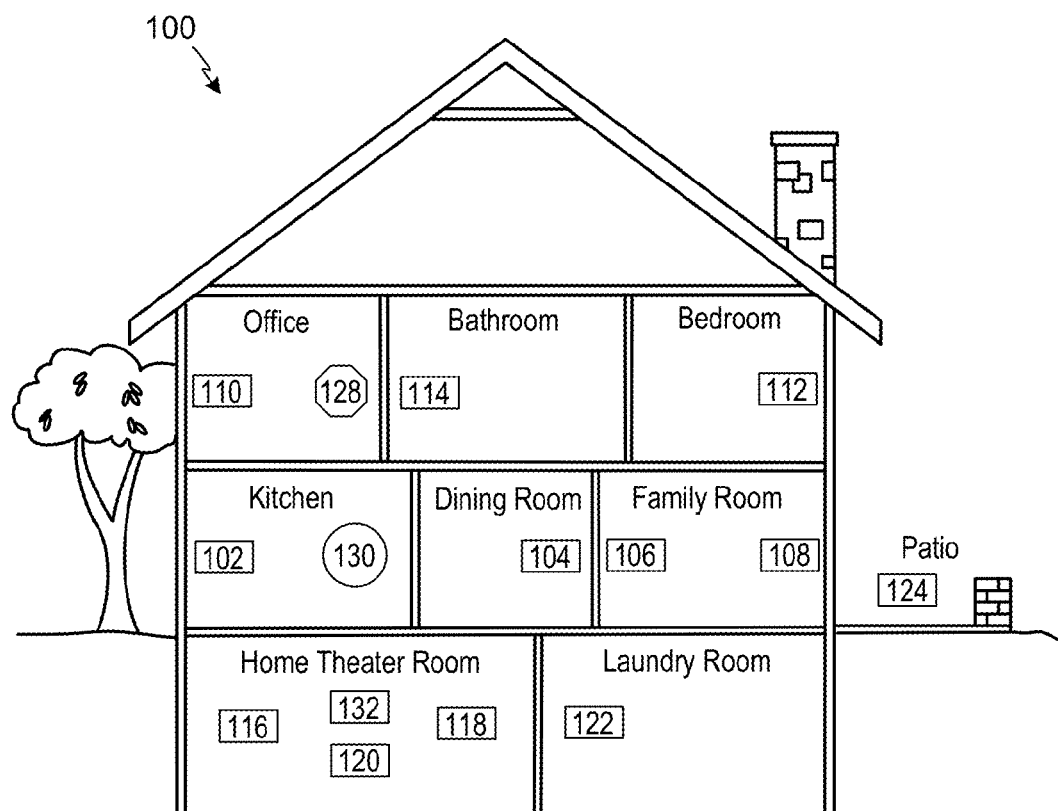
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein involve selecting a group coordinator device for a group of media devices of a networked media playback system, and further selecting a coordinator device for paired or consolidated players.

In an example embodiment, a networked media playback system may include a plurality of media devices that may be grouped together to render media content in synchrony. Each of the plurality of media devices may be configured to communicate with one another. In one example, a particular device from the plurality of media devices may be configured to receive the media content to be rendered from a local media content source or a remote media content source, and distribute the media content to the other media devices in the media playback system for playback. The particular device may also be configured to coordinate synchronous playback by the plurality of media devices by providing playback timing information to each of the plurality of media devices. For discussions herein, the particular device may be referred to as the group coordinator device for the group of media devices.

The plurality of media devices may include devices in different zones in a household. For example, the plurality of media devices may be organized into multiple zones, including a "kitchen" zone, a "dining room" zone, and a "living room" zone, for example. In one scenario, each of the zones may initially be rendering different audio content. At some point, one zone may be grouped with another zone. For instance, the kitchen zone may be grouped with the dining room zone. In such a case, a media device that is in the dining room zone may be designated as the group coordinator by virtue of being in the dining room zone that the kitchen zone was added to. On the other hand, if the dining room zone was grouped with the kitchen zone, a media device in the kitchen zone may be designated as the group coordinator device by virtue of being already in the kitchen zone that the dining room zone was added to.

In some cases, however, another media device in the group may be better suited to be the group coordinator device than the designated group coordinator device. In one embodiment, the media devices in the media playback system may be configured to communicate over a network according to a spanning tree protocol (STP) or some variant thereof. In such a case, if another particular media device in the group is closer to a root of the spanning tree than the designated group coordinator device, then the synchronous rendering of audio content by the group of media device may be more efficiently performed if the particular media device is the group coordinator device rather than the designated group coordinator device. Accordingly, the particular media device may be better suited to be the group coordinator device of the group. Other factors, such as respective processing capabilities of each media device in the plurality of media devices in the group, and a communicative distance between each of the media devices in the plurality of media devices in the group and a source of the media content being rendered by the group, may be also factor into whether another media device in the group may be better suited to be the group coordinator device than the designated group coordinator.

As such, in an embodiment of the present application, a media playback system may be configured to select a media device out of the plurality of media devices in the media playback system to be the group coordinator device of a group of media devices in the media playback system based on various quantitative evaluations and analyses relating to the media devices in the media playback system and network configurations of the media playback system, including but not limited to those mentioned above.

In some cases, two or more devices from the media playback system may be in a bonded zone of paired or consolidated players. In discussions herein, and as will be discussed further below, a bonded zone may refer to a zone of two or more playback devices configured to render media content in synchrony. In some cases, the two or more playback devices may be configured to render different components of the media content. For instance, a first playback device in the bonded zone may play a left channel component of the audio content, and a second playback device in the bonded zone may play a right channel component of the audio content, forming a stereo pair.

In this example, one of the two playback devices in the stereo pair may be a coordinator device, or "primary" device for the pair, and may be configured to receive media content to be rendered, and provide to the other playback device in the pair the component of the audio content to be rendered by the other playback device as well as playback timing information for synchronized playback. In some cases, the coordinator device for the pair may have been designated as whichever device the other playback device was added to when forming the stereo pair, similar to the designated group coordinator device discussed above.

Analogously, embodiments of the present application may involve selecting a particular media device from the media playback system as the coordinator device for playback devices in the bonded zone. Selection of the particular media device, as with the case of selecting a group coordinator device discussed above, may be based on various quantitative evaluations and analyses and combinations thereof relating to the individual media devices and network configurations of the media playback system.

As indicated above, the present application involves selecting a group coordinator device for a media playback system of a plurality of media devices. In one aspect, a method is provided. The method involves establishing a group of one or more devices in a media playback system. The one or more devices are configured to render audio content in synchrony, and a first device of the one or more devices in the media playback system is a group coordinator configured to provide audio content data and audio content playback timing information to other devices in the group. The method further involves performing an evaluation of one or more parameters associated with the one or more devices in the media playback system, based on the evaluation, determining that a second device in the one or more devices in the media playback system is to be the group coordinator, and causing the second device to become the group coordinator of the group of one or more devices in the media playback system.

In another aspect, a network device is provided. The network device includes a processor, and memory having stored thereon instructions executable by the processor to cause the network device to perform functions. The functions include establishing a group of one or more devices in a media playback system. The one or more devices are configured to render audio content in synchrony, and a first device of the one or more devices in the media playback system is a group coordinator configured to provide audio content data and audio content playback timing information to other devices in the group. The functions further include performing an evaluation of one or more parameters associated with the one or more devices in the media playback system, based on the evaluation, determining that a second device in the one or more devices in the media playback system is to be the group coordinator, and causing the second device to become the group coordinator of the group of one or more devices in the media playback system.

In yet another aspect, a non-transitory computer readable memory is provided. The non-transitory computer readable memory has stored thereon instructions executable by a computing device to cause the computing device to perform functions. The functions include establishing a group of one or more devices in a media playback system. The one or more devices are configured to render audio content in synchrony, and a first device of the one or more devices in the media playback system is a group coordinator configured to provide audio content data and audio content playback timing information to other devices in the group. The functions further include performing an evaluation of one or more parameters associated with the one or more devices in the media playback system, based on the evaluation, determining that a second device in the one or more devices in the media playback system is to be the group coordinator, and causing the second device to become the group coordinator of the group of one or more devices in the media playback system.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, although it should be understood that the home could be configured with only one zone. Additionally, one or more zones can be added to the configuration 100 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. Zone players 102-124, also referred to herein as playback devices, multimedia units, speakers, players, and so on, provide audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
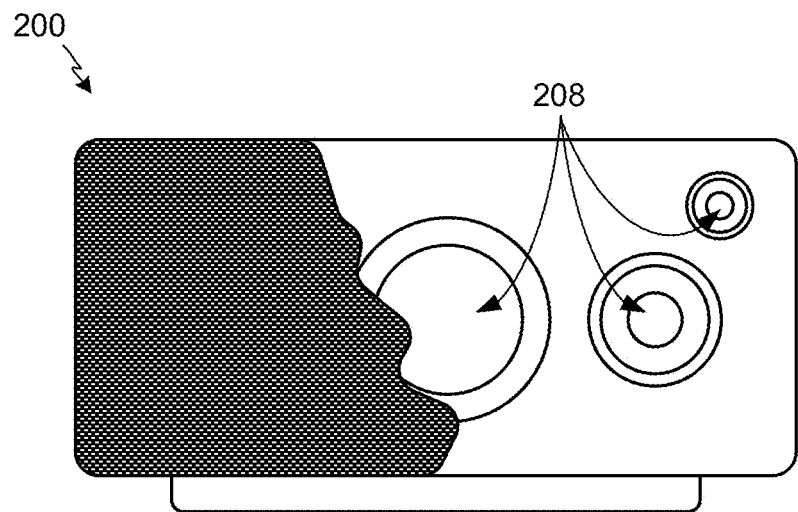
FIG. 2A shows an illustration of an example zone player having a built-in amplifier and transducers.
Figure 2B:
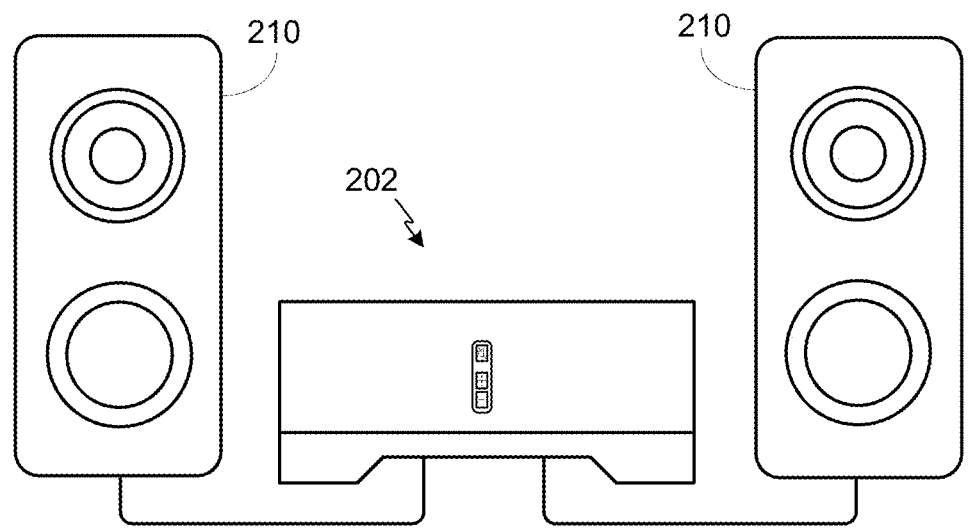
FIG. 2B shows an illustration of an example zone player having a built-in amplifier and connected to external speakers.
Figure 2C:
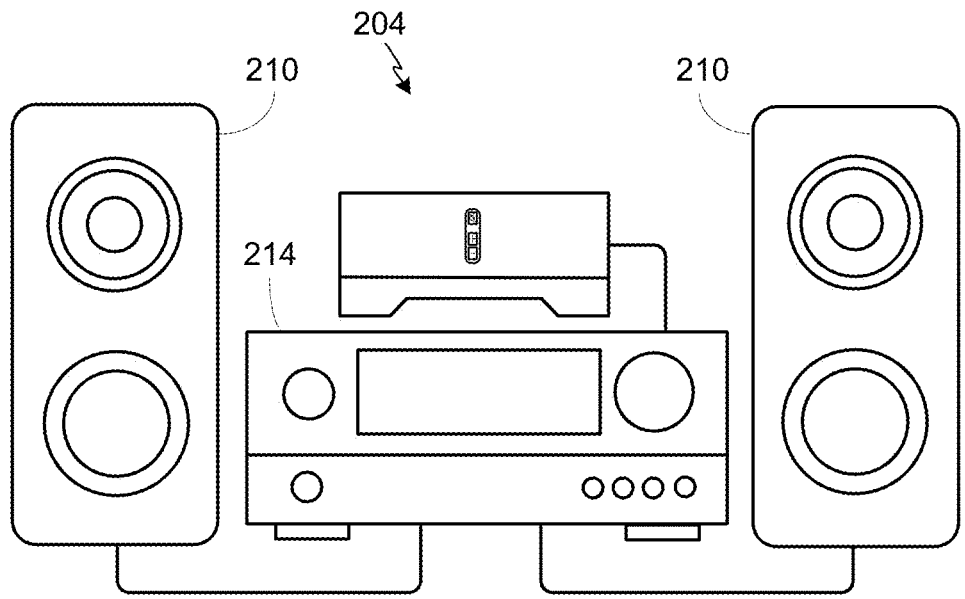
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates a zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the media content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, radio station name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple iPod™ or similar device.

b. Example Controllers

Figure 3:
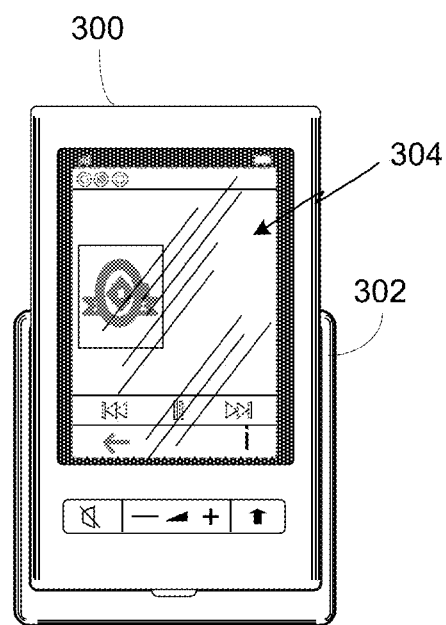
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, modify and/or clear the playback queue of one or more zone players, control other operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

Zone players 102-124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, a "bonded zone" contains two or more zone players, such as the two zone players 106 and 108 in the family room whereby the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for an individual to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as Airplay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
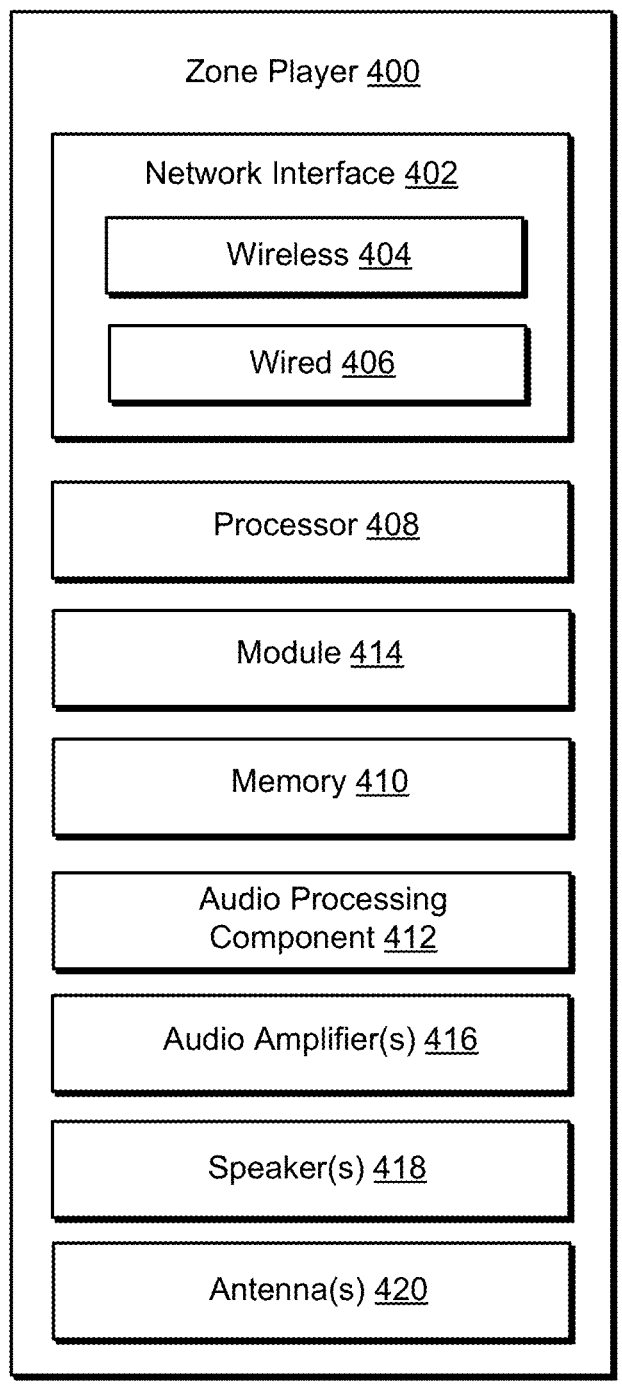
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
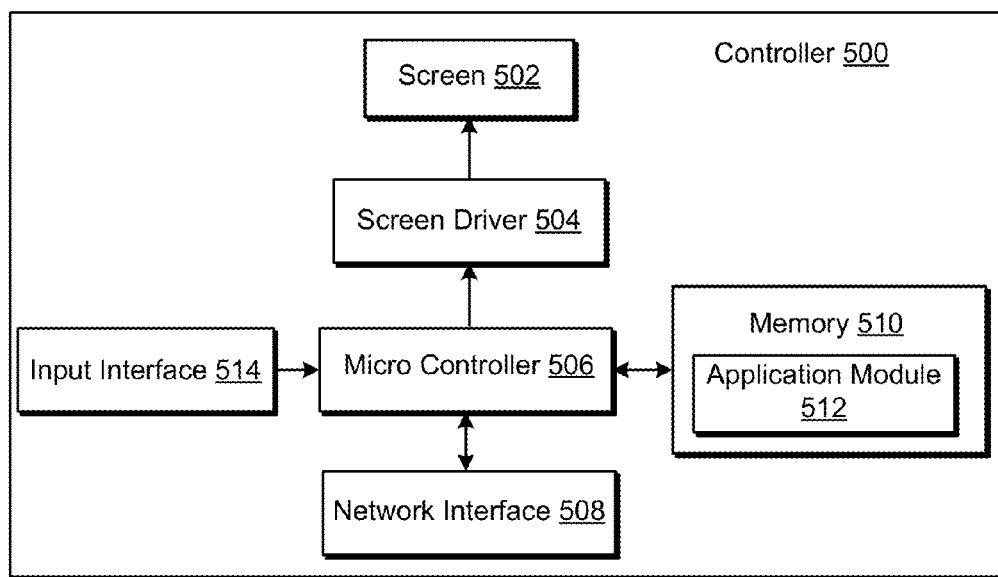
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group to facilitate synchronized playback amongst the zone players in the zone group. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone™, iPad™ or any other smart phone or network-enabled device (e.g., a networked computer such as a PC or Mac™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
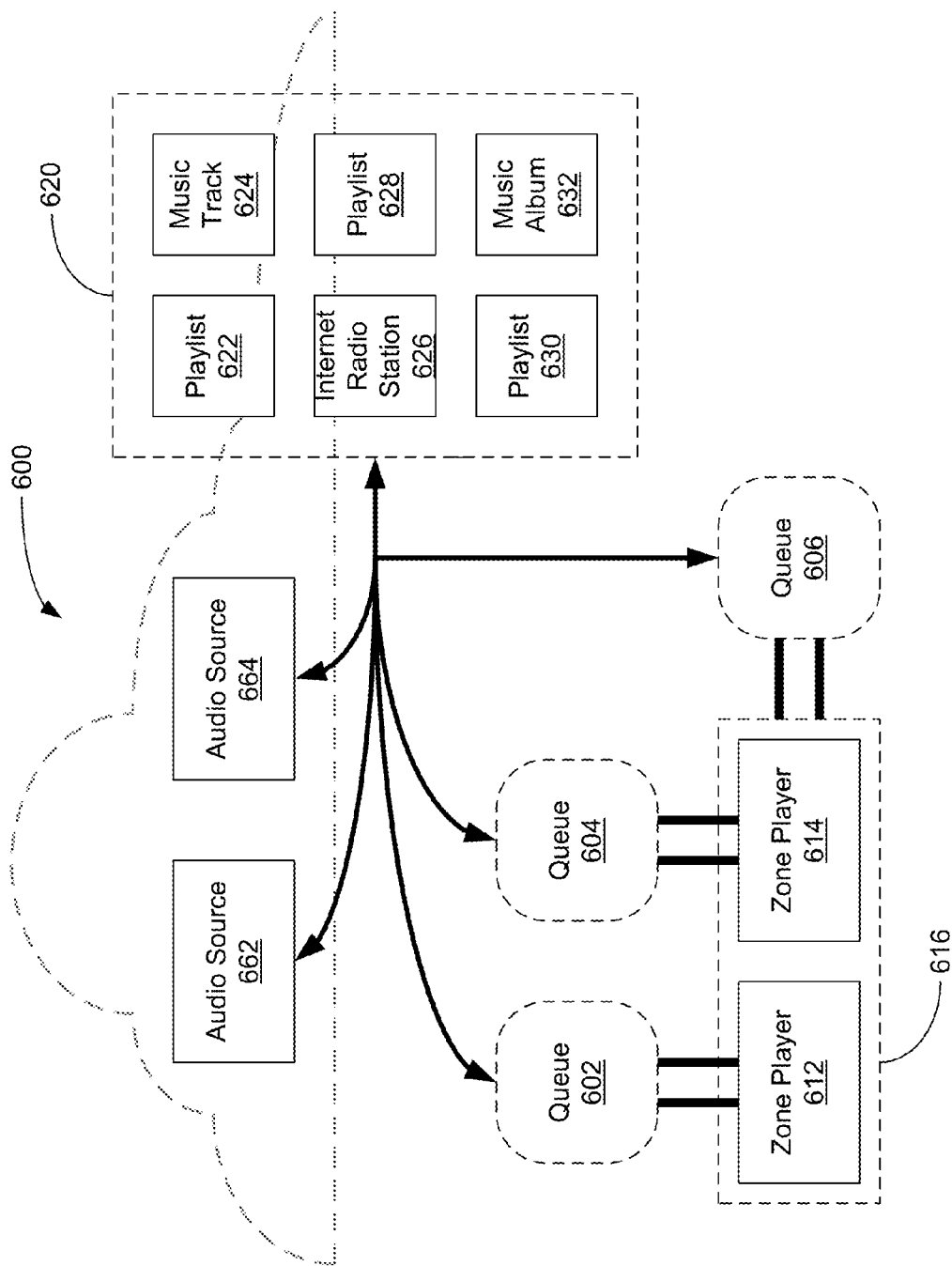
FIG. 6 shows an example playback queue configuration for a media playback system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e., URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
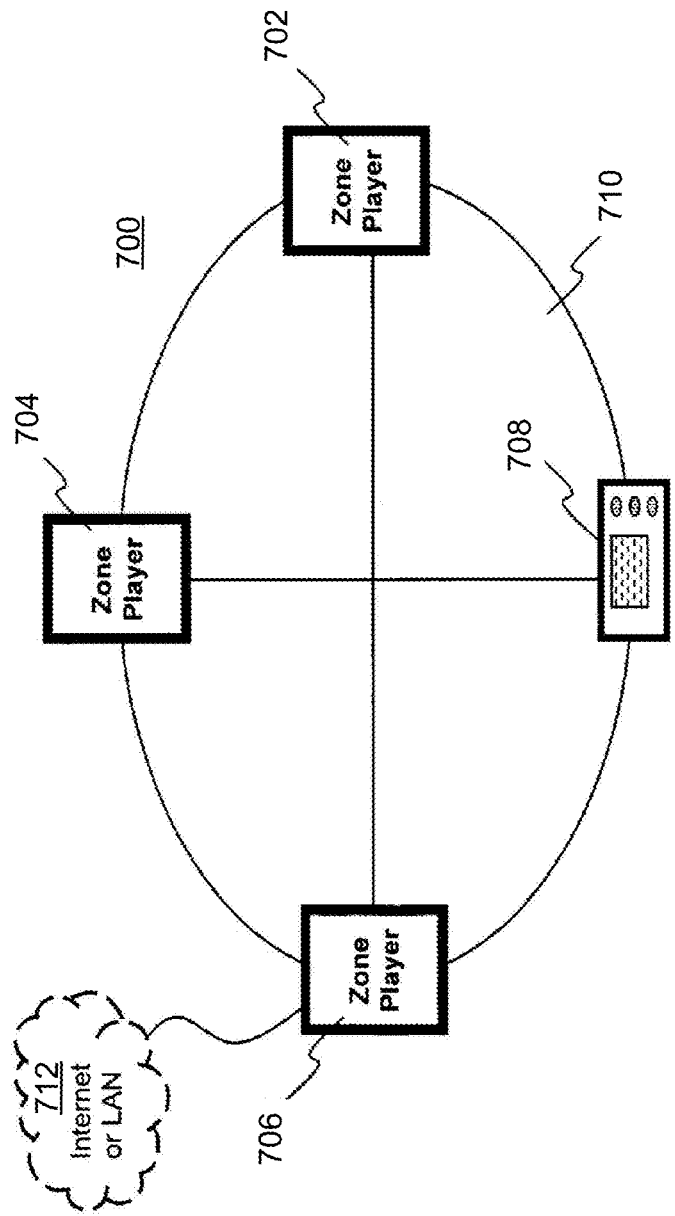
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys).

In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
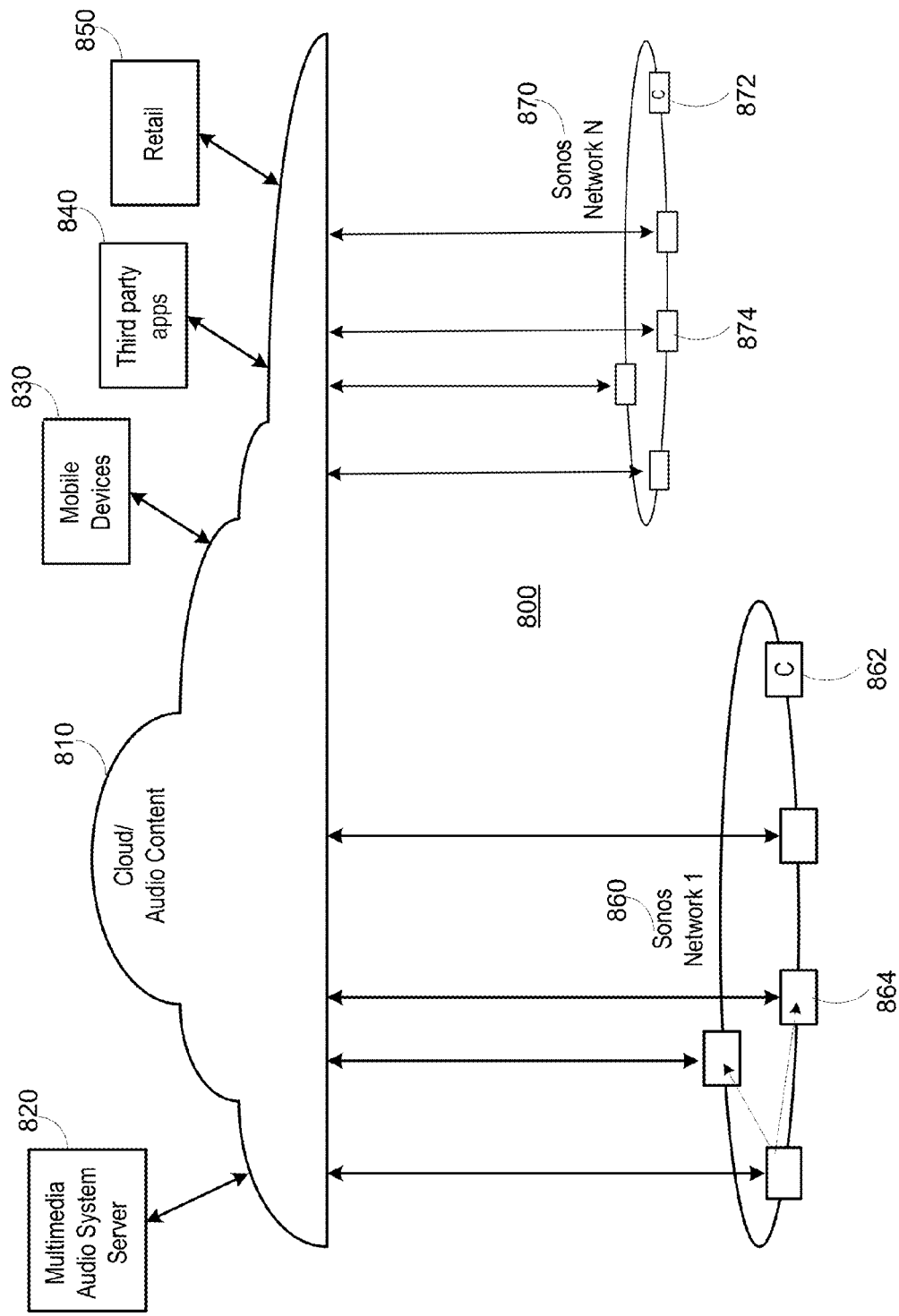
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example Group Coordinator Device Selection

Figure 9:
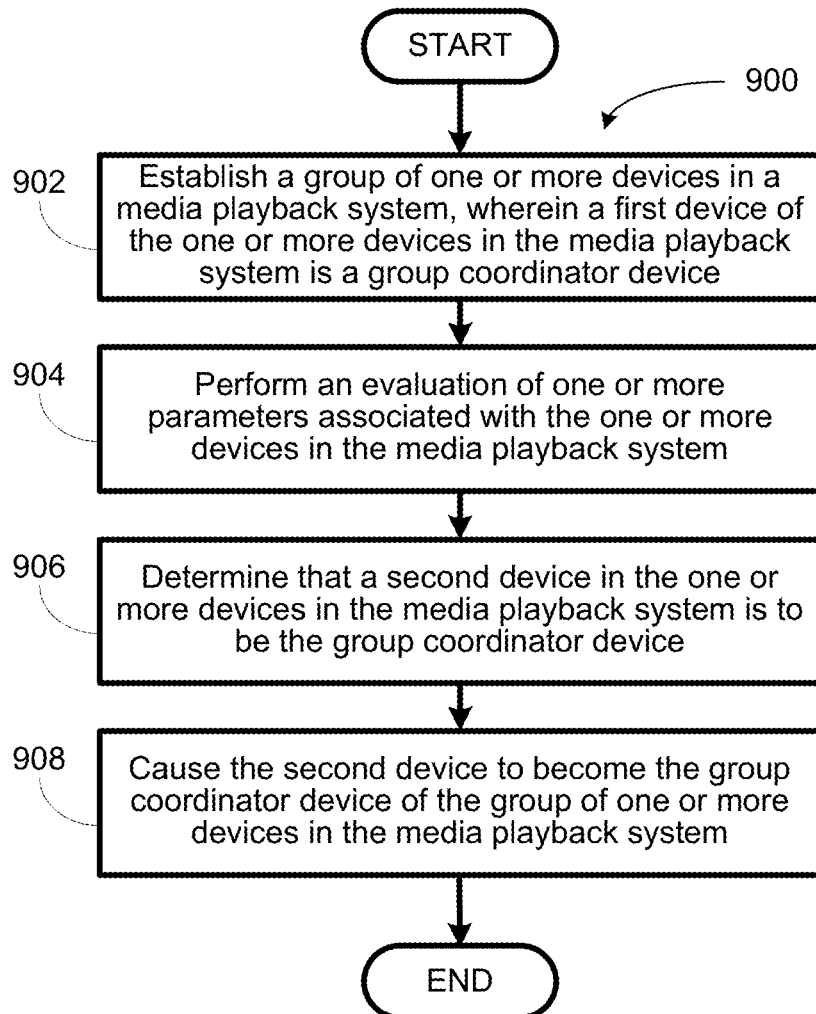
FIG. 9 shows a flow diagram of an example method for selecting a group coordinator device in a media playback system.

As discussed above, embodiments described herein involve selecting a group coordinator device for a group of media devices of a networked media playback system. FIG. 9 shows a flow diagram of an example method 900 for selecting a group coordinator device in a media playback system, in accordance with at least some embodiments described herein. Method 900 shown in FIG. 9 presents an embodiment of a method that could be used in the environments 100, 600, 700, and 800 with the systems 200, 202, 204, 300, 400, and 500 for example, in communication with one or more devices, such as those illustrated in FIGS. 2-5. Method 900 shown in FIG. 9 may be performed by a device, such as a root device in an STP-type network configuration, a network server device, or an existing group coordinator device as will be defined and discussed in the following discussions. Method 900 may include one or more operations, functions, or actions as illustrated by one or more of blocks 902-908. Although the blocks are illustrated in sequential order, these blocks may also be performed in parallel, and/or in a different order than those described herein. Also, the various blocks may be combined into fewer blocks, divided into additional blocks, and/or removed based upon the desired implementations.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

At block 902, the method 900 may involve establishing a group of one or more devices in a media playback system. As discussed previously in connection to FIG. 1, the media playback system may include a plurality of devices each assigned to a zone in a household. In some cases, a user of the media playback device may wish to enjoy media content in more than one zone and may combine two or more of the zones into a group (also referred to as a "zone group"). Each of the devices in the group may be configured to render media content in synchrony.

In one example, a first device from the one or more devices in the media playback system may be a group coordinator device configured to provide audio content data and audio content playback timing information to other devices in the group to facilitate the synchronized audio content playback. Accordingly, in some cases, establishing the group of one or more devices in a playback system may involve selecting or designating the first device as the group coordinator of the group.

In one example, the first device may be designated as the group coordinator device by virtue of being a device in a zone or group that the other devices are being added to. For instance, as previously discussed, the media playback system may include a "kitchen" zone, a "dining room" zone, and a "living room" zone. In the case the kitchen zone playback devices are being grouped with, or added to the dining room zone, a playback device in the dining room zone may be designated as the group coordinator. In other words, if a second device from a second zone is being grouped with or added to a first zone with the first device, the first device may automatically be designated as the group coordinator device of the new group by virtue of being in the first zone that the second was added to. On the other hand, if the dining room zone was grouped with the kitchen zone, a media device in the kitchen zone may be designated as the group coordinator device by virtue of being already in the kitchen zone that the dining room zone was added to.

In other embodiments, if one of the media devices in the new group is coupled directly to a media source via a direct line to the source or direct line to a router/modem in communication with a remote media content server, the media device may be designated as the group coordinator device. Further, if one of the media devices in the new group is a root device in a STP configuration of the media playback system, the media device may be designated as the group coordinator device. Other examples are also possible.

Figure 10A:
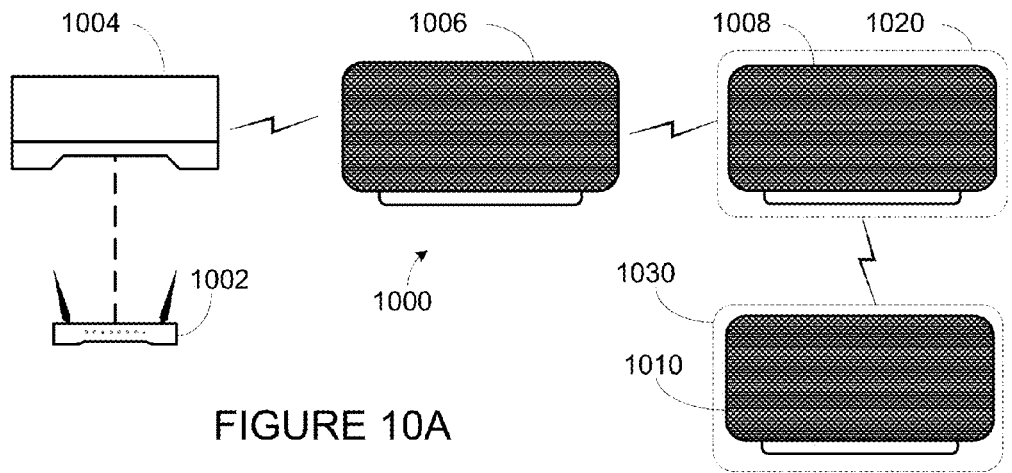
FIGS. 10A-C show a first series of example group coordinator configurations in a media playback system.

FIG. 10A shows an example media playback system 1000 including a router 1002, and media devices 1004, 1006, 1008, and 1010. As shown, media devices 1006, 1008, and 1010 may be devices with built-in playback capabilities, while media device 1004 may be an amplifier or media data processor without built-in playback capabilities. In one example, the speakers may be coupled to the media device 1004 for playback of media content. Also as shown in FIG. 10A is that the media device 1010 may be the first device discussed above, and a zone (or "group") 1030 may be the first zone referenced above. Further, the media device 1008 may be the second device discussed above, and a zone 1020 may be the second zone referenced above.

In the configuration of the media playback system 1000 as shown, media device 1004 may be coupled to the router 1002 via a direct line, media device 1006 may be wirelessly coupled to the media device 1004, media device 1008 and media device 1010 may be wireless coupled to the media device 1008. In such a configuration, media device 1010 may receive media content from a remote media server via the router 1002 through media devices 1004, 1006 and 1008.

Figure 10B:
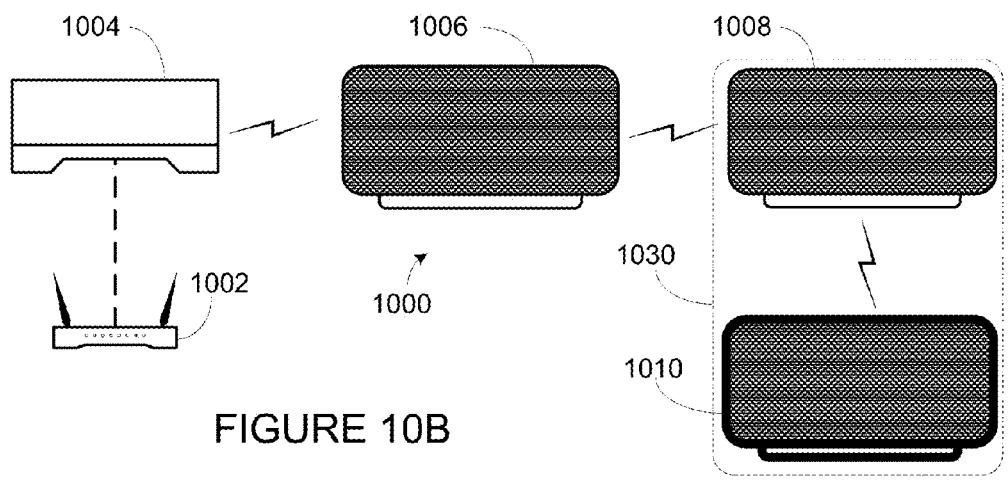

FIG. 10B shows the example playback media playback system 1000 subsequent to the media device 1008 being added or grouped with the media device 1010 in the first zone 1030. As suggested above, the media device 1010 may be designated as the group coordinator device for the media playback system 1000 in this case because the first media device 1010 was already in the first zone 1030 and may already have been configured to receive media content to be rendered by the zone 1030.

At block 904, the method 900 may involve performing an evaluation of one or more parameters, by a first device, associated with the one or more devices in the media playback system. In one example, the evaluation may be performed by the group coordinator device, which in one case may be the first device. Performing an evaluation of one or more parameters may involve retrieving the parameters from each of the one or more media devices in the media playback system. For instance, a message may be sent, by the first device, to each of the media devices in the media playback system requesting the parameters associated with each respective media device. In one example, the at least one or more parameters associated with the one or more devices in the media playback system and/or the evaluation of the one or more parameters associated with the one or more devices in the media playback system may be stored on each of the media devices in the group, or at least one of the media devices in the group. In some cases, the at least one or more parameters associated with the one or more devices in the media playback system and/or the evaluation of the one or more parameters associated with the one or more devices in the media playback system may be stored on the current group coordinator device.

The one or more parameters associated with the one or more devices may indicate a communicative role of the respective media device. For example, the parameters may indicate any group affiliation of a media device, and further a bonded zone affiliation of the media device if relevant. For instance, parameters associated with the media device 1008 may indicate that the media device 1008 is a part of the group 1030, as shown in FIG. 10B. The parameters may further indicate capabilities of a media device. For instance, parameters associated with the media device 1006 may indicate processing capabilities (i.e. CPU speed and RAM capacity, internet bandwidth, etc.) and communication capabilities (Ethernet, IEEE 1394 High Speed Serial Bus, Wi-Fi, etc.) of the media device 1006.

In addition, the parameters may indicate network configurations associated with the media device. For instance, parameters associated with the media device 1004 may indicate that the media device 1004 is coupled to and in communication with the router 1002 via a direct line. In one example, the media device 1004 may be a root of an STP configuration of the media playback system 1000. In one case, the parameters associated with each of the media devices 1004, 1006, 1008, and 1010 may further indicate respective root paths for each of the media devices. The root path cost of a media device may represent a computing cost of communicating with the media device given the network configuration of the media playback system 1000. The values shown in the following example are meant to illustrate possible computing costs, and alternate values are possible. For example, if the media device 1004 is the root of the STP configuration of the media playback system 1000, the root path cost for the media device 1004 is zero. Further in this example, an illustrative root path cost of the media device 1006 may be 20, an illustrative root path cost of the media device 1008 may be 40, and an illustrative root path cost of the media device 1010 may be 70. In other words, because communication between the media device 1010 and the root media device 1004 involves communicating with both the media device 1006 and media device 1008, the root path cost of the media device 1010 may be higher than each of the media device 1006 and 1008. Analogously, the root path cost of the media device 1008 may be higher than that of the media device 1006 and lower than that of the media device 1010.

In another example, parameters associated with the media device 1006 may indicate that the media device 1006 may be coupled to a local media content server via a direct line. As such, while the media device 1006 may not be the root media device of the media playback system 1000, may have a root path cost of zero if media content being rendered by the group 1030 is from the local media content server. In other words, different root path costs may exist depending on different media content sources. Other examples are also possible, depending on different possible network configuration of the media playback system 1000.

Prior to performing an evaluation of one or more parameters associated with the one or more devices in the media playback system, a determination may first be made, by the first device, that the evaluation of one or more parameters associated with the one or more devices in the media playback system should be performed. One or more events relating to the media playback system may trigger the evaluation. In one example, the one or more events may be events associated with modifications to a configuration of the media playback system. For instance, the evaluation may be triggered by an addition of a new device to the media playback system. In one case, parameters associated with a new device added to the media playback system may be provided or retrieved upon becoming a device in the media playback system. In addition, the one or more events may also include a change in group affiliation by a device (i.e. a device leaving or joining a group), a change in parameters of a device (i.e. a device entering power-save or sleep mode, thereby reducing communicative access to the device), a change in a role of a device in the media playback system (i.e. a device becoming a root device or discontinue acting as the root device in an STP configuration), or as suggested above, a change in media content source (i.e. from remote media content server to local media content server coupled to a different media device, or vice versa).

In another example, the evaluation of the parameters may be triggered periodically. For instance, the media playback system may be configured to evaluate the parameters at predetermined intervals, such as every 60 minutes, for example. In a further example, evaluation of the parameters may be triggered by a user-input indicating that the evaluation of one or more parameters associated with the one or more devices in the media playback system should be performed.

In the configuration of the media playback system 1000 as shown in FIGS. 10A and 10B discussed previously, the media device 1010 may be designated as the group coordinator for group 1030, and may receive media content from a remote content server, via the router 1002, and through media device 1006 and 1008. Accordingly, as the group coordinator device for the group 1030, the first media device 1010 may perform group coordinator device tasks, which may include receiving media content through the media device 1006 and the media device 1008, processing the media content, generating playback timing information, and subsequently sending at least a portion of the media content/playback timing information back to the media device 1008 for synchronized playback. As such, the media device 1008 may effectively receive the media content twice, which may not be an efficient configuration for the media playback system 1000.

Referring back to the method 900 of FIG. 9, at block 906 may involve determining that a second device in the one or more devices in the media playback system is to be the group coordinator device. During an evaluation of the parameters associated with the media devices 1004, 1006, 1008, and 1010 of FIG. 10B, a determination may be made based on at least the root path cost associated with each of the media devices 1004, 1006, 1008, and 1010 that the media device 1008 may be a more suitable group coordinator device. For instance, as indicated above, the root path cost of the media device 1008 may be 40, and accordingly less than the root path cost of the media device 1010 which may be 70. Accordingly, based on root path cost evaluations, media device 1008 may be a more efficient group coordinator device than the media device 1010 in the configuration of the media playback system 1000 as shown.

In another example, the parameters associated with the media devices 1004, 1006, 1008, and 1010 may be evaluated in combination (i.e. a weighted average of the parameters). For instance, in addition to the root path cost, computing capabilities of the media devices 1004, 1006, 1008, and 1010 may also be considered, and whether the media devices are members of the group being evaluated. In such a case, if the media device 1010 has the best computing capability among the media devices 1004, 1006, 1008, and 1010, and depending on the weighing of the different parameters being evaluated in this example, the media device 1010 may ultimately still be determined to be the most suitable group coordinator device despite having a higher root path cost.

At block 908, the method 900 may involve causing the second device to become the group coordinator of the group of one or more devices in the media playback system. In one case, if the media device 1010 of FIG. 10B has been determined to still be the most suitable group coordinator device, the media device 1010 may continue to perform group coordinator device tasks including receiving media content from the remote media content server via the media device 1004, media device 1006, and media device 1008, processing the media content, generating playback timing information, and providing at least a portion of the media content and the playback timing information to the media device 1008 for synchronized playback of the media content.

On the other hand, if the second device, which in this case may be the media device 1008, was determined to be the most suitable group coordinator device, the media device 1008 may accordingly be configured to perform the group coordinator device tasks of receiving media content being rendered by the group 1030 from the remote media content server via the media device 1004 and media device 1006, processing the media content, generating playback timing information, and providing at least a portion of the media content and the playback timing information to the media device 1010 for synchronized playback of the media content. During the transition of group coordinator devices, if the at least one or more parameters associated with the one or more devices in the media playback system and/or the evaluation of the one or more parameters associated with the one or more devices in the media playback system was stored only on the original group coordinator device, the original group coordinator device, which in this case may be the media device 1010 may be configured to provide the at least one or more parameters associated with the one or more devices in the media playback system and/or the evaluation of the one or more parameters associated with the one or more devices in the media playback system to the new group coordinator device, which in this case may be the media device 1008.

Figure 10C:
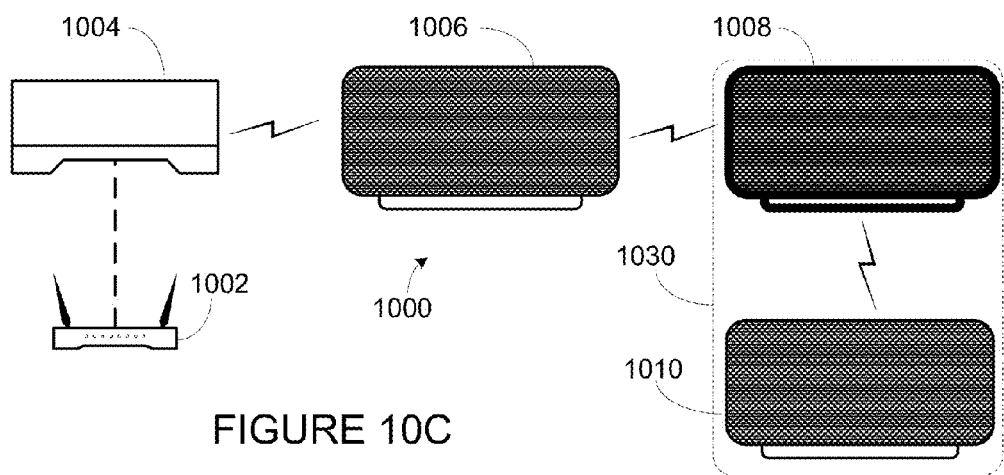

Accordingly, the media device 1010 may stop performing the group coordinator device tasks. As shown in FIG. 10C, the media playback system 1000 may include the group 1030 as shown in FIG. 10B, but with media device 1008 as the group coordinator device, rather than the media device 1010.

In the case a different media device is to become the group coordinator device for a group, such as if the media device 1008 is to become the group coordinator device for the group 1030 in place of the media device 1010, a suitable time interval during which the transition should take place may be determined. In one example, if the group is not currently rendering media content, the transition may occur immediately. On the other hand, if media content is currently being rendered by the group 1030, the transition may be postponed until playback of the current media content has been completed or otherwise stopped, and executed before the group 1030 begins rendering a subsequent media content. In other words, causing the second media device 1008 to become the group coordinator of the group 1030 may involve, in this case, determining that rendering of media content by the group 1030 has stopped, and subsequently causing the second media device 1008 to become the group coordinator of the group 1030.

Figure 11A:
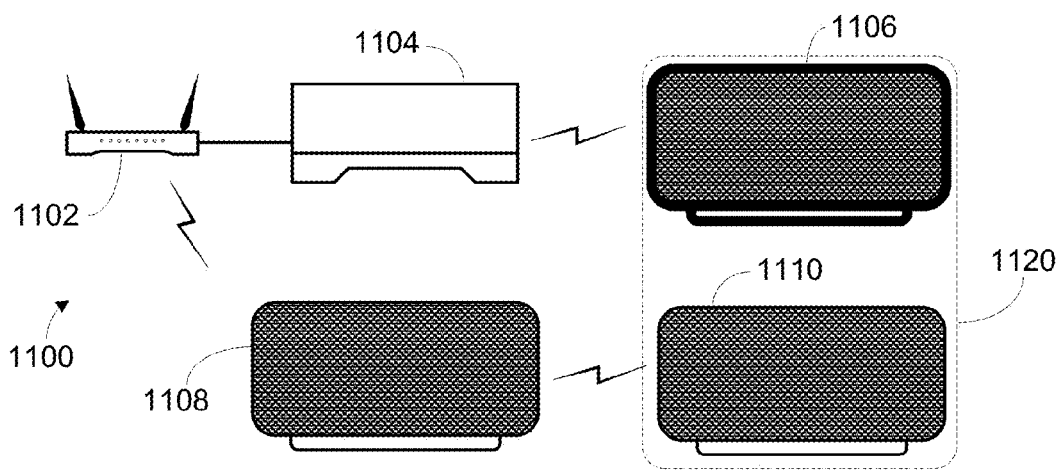
FIGS. 11A-C shows a second series of example group coordinator configurations in a media playback system.

As an additional example, FIG. 11A shows an example media playback system 1100 including a router 1102, and media devices 1104, 1106, 1108, and 1110, similar to the media playback system 1000 described above in connection to FIGS. 10A-C. In contrast to the media playback system 1000, the media playback system 1100 is configured according to an STP or variant thereof such that the media device 1104 is coupled to the router 1102 via a direct connection (such as, for example, a wired Ethernet connection). Media device 1106 is in communication with the media device 1104 via a wireless link, while the media device 1108 is in communication with the media device 1104 via the router 1102. As shown, the media device 1108 may be in communication with the router 1102 via a wireless link. Media device 1110 is in communication with the media device 1108 via a wireless link. In one example, the media device 1104 may be configured as a root device in the media playback system 1100. Accordingly, for illustration purposes only, the root path costs and group affiliations of the media devices 1104, 1106, 1108, and 1110 may be provided as shown in Table 1 below.

TABLE 1

| Media Device | Root Path Cost | Group Affiliation |
|---|---|---|
| 1104 | 0 | — |
| 1106 | 150 | 1120 Coordinator |
| 1108 | 10 | — |
| 1110 | 160 | 1120 Member |

As shown in Table 1, the media device 1104, being the root device may have a root path cost of zero, and the media device 1106 may have a root path cost of 150. The media device 1108, by being directly in communication with the router 1002 may have a root path cost of 10, and the media device 1110 may have a root path cost of 160. In this particular example, the cost of communication between media devices 1104 and 1106, and the cost of communication between media devices 1108 and 1110 may both be 150, and accordingly, the root path cost of media device 1110 may be 150 plus the root path cost of media device 1108, which is 10, resulting in a root path cost of 160.

Also as shown in FIG. 11A and Table 1, media playback system 1100 may include a group 1120 of media devices 1106 and 1110 configured to render media content in synchrony. In this case, media device 1106 may have a group affiliation as shown in Table 1 of being the group coordinator device of the group 1120, either by default or by selection due to media device 1106 having a root path cost of 150, which is less than the root path cost of media device 1110 of 160. The media device 1110 has a group affiliation of being a member of the group 1120.

Figure 11B:
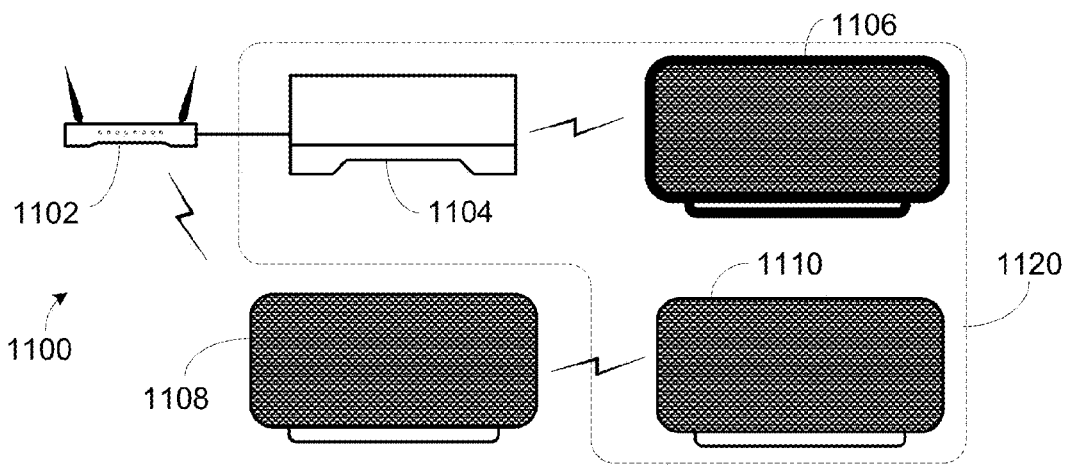

As shown in FIG. 11B, media device 1104 may be added to the group 1120 which already includes media device 1106 and 1110. As shown in FIG. 11B and indicated in Table 2 below, the group affiliation for the media device 1104 may now be that of being a member of the group 1120. In this example, because no modifications were made to a network topology of the media playback system 1100, the root path costs for each of the media devices 1104, 1106, 1108, and 1110 may remain the same. Upon media device 1104 joining the group 1120, the media device 1106 may initially remain as the group coordinator device for the group 1120.

TABLE 2

| Media Device | Root Path Cost | Group Affiliation |
| --- | --- | --- |
| 1104 | 0 | 1120 Member |
| 1106 | 150 | 1120 Coordinator |
| 1108 | 10 | — |
| 1110 | 160 | 1120 Member |

As some point, either triggered by the addition of the media device 1104 to the group 1120, or another event as discussed above in connection to block 904, evaluations of parameters associated with the media devices 1104, 1106, 1108, and 1110 may be performed. Based on the evaluations, a determination may be made based on for example, at least the root path costs of each of the media devices 1104, 1106, 1108, and 1110 and/or other parameters discussed above in connection to block 906 of method 900 that media device 1104 should be the group coordinator device of the group 1120.

Figure 11C:
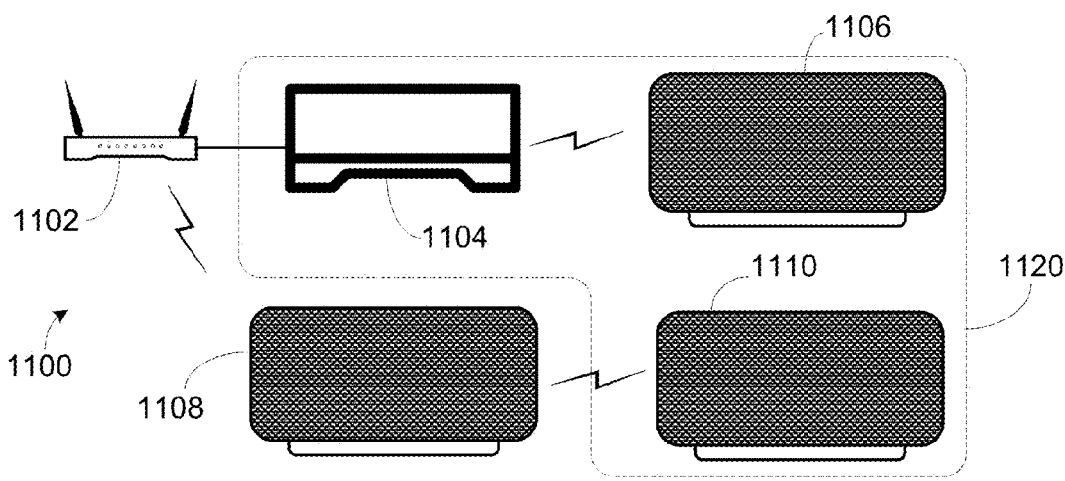

FIG. 11C shows a configuration of the media playback system 1110 after which the media device 1104 has become the group coordinator device of the group 1120. As shown in Table 3 below, the group affiliation of media device 1104 is now the group coordinator device of the group 1120, while the group affiliation of media device 1106 is now a member of the group 1120. As suggested previously, the transition of group coordinator device designations from media device 1106 to media device 1104 may have occurred during a break in media content playback by the group 1120.

TABLE 3

| Media Device | Root Path Cost | Group Affiliation |
| --- | --- | --- |
| 1104 | 0 | 1120 Coordinator |
| 1106 | 150 | 1120 Member |
| 1108 | 10 | — |
| 1110 | 160 | 1120 Member |

While the examples provided herein may suggest that a group coordinator device may be selected from among media devices in the group of media devices, one having ordinary skill in the art will appreciate that a device in the media playback system that is not among the group of media devices may be selected or initially designated as the group coordinator device for the group. Other examples are also possible.

VIII. Example Selection of Coordinator Device for Multichannel Playback

As discussed above, embodiments described herein may further involve selecting a coordinator device for the bonded zone of playback devices for multichannel playback. A bonded zone may refer to, for example, a zone of two or more playback devices paired or consolidated to render media content in synchrony, as described above. In some cases, the two or more playback devices may be configured to render different components of the media content. For instance, a first playback device in the bonded zone may play a right channel component of the audio content, and a second playback device in the bonded zone may play a left channel component of the audio content, forming a stereo pair.

One of the two playback devices in the stereo pair may be a coordinator device for the pair, and may be configured to receive media content to be rendered, and provide to the other playback device in the pair with the component of the audio content to be rendered by the other playback device as well as playback timing information for synchronized playback. In some cases, the coordinator device for the pair may have been designated as whichever device the other playback device was added to when forming the stereo pair. While discussions of a bonded zone herein may generally refer to a stereo pair of playback devices, bonded zones may include three or more playback devices. For instance, a bonded zone may include a center speaker and/or a subwoofer in addition to the left and right channel speakers.

Embodiments of the present application may involve selecting a particular device from the media playback system as the coordinator device for playback devices in the bonded zone. In some ways, selection of the particular device to be the coordinator device may be similar or analogous to the selection of the group coordinator device discussed above, but in the context of a bonded zone rather than a zone group. As such, selection of a coordinator device for a bonded zone may also be based on various quantitative evaluations and analyses and combinations thereof relating to the individual media devices and network configurations of the media playback system.

Figure 12:
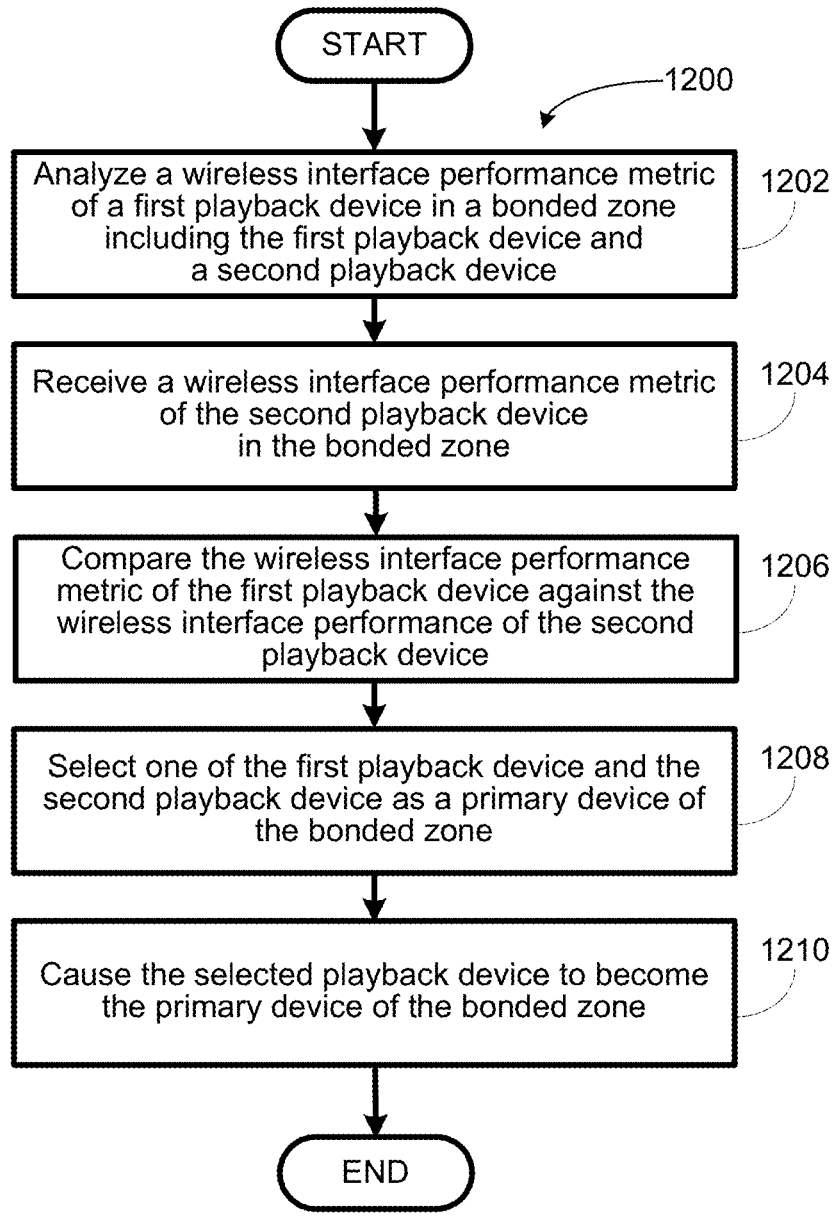
FIG. 12 a flow diagram of an example method for selecting a coordinator device for multichannel playback.

FIG. 12 shows a flow diagram of an example method 1200 for selecting a group coordinator device in a media playback system, in accordance with at least some embodiments described herein. Method 1200 shown in FIG. 12 presents an embodiment of a method that could be used in the environments 100, 600, 700, and 800 with the systems 200, 202, 204, 300, 400, and 500 for example, in communication with one or more devices, such as those illustrated in FIGS. 2-5. In some cases, the method 1200 may be performed for example, by a current coordinator device for the bonded zone, or by the primary player of the bonded zone. Method 1200 may include one or more operations, functions, or actions as illustrated by one or more of blocks 1202-1210. Although the blocks are illustrated in sequential order, these blocks may also be performed in parallel, and/or in a different order than those described herein. Also, the various blocks may be combined into fewer blocks, divided into additional blocks, and/or removed based upon the desired implementations.

At block 1202, the method 1200 may involve analyzing, by a device, a wireless interface performance metric of a first playback device in a bonded zone including the first playback device and a second playback device. The wireless interface performance metric of a device may be a metric indicative of a reliability of a wireless communication of the device. In one example, the wireless interface performance metric of the device may include a received signal strength indication (RSSI), in which a stronger received signal strength may indicate a higher wireless interface performance of the device. In another example, the wireless interface performance metric of the device may include a packet error rate (PER), in which a lower error rate may indicate a higher wireless interface performance of the device. In some cases, the wireless interface performance metric of the device may include both the RSSI and PER. Other examples and combinations thereof may also be possible.

As previously discussed, the first playback device and the second playback device of the bonded zone may be configured to render audio content in synchrony, sometimes by rendering different components (such as a right channel component and a left channel component) of the audio content. As such, prior to analyzing a wireless interface performance metric of the first playback device, a determination may first be made that the first playback device was added to the bonded zone, and further that the first playback device is configurable to receive the audio content from the audio source, and forward at least a portion of the received audio content to the second playback device during rendering of the audio content by the bonded zone. In other words, selection of the coordinator device for a bonded zone may first be triggered by an establishment of a bonded zone, and further that at least one of the playback devices in the established bonded zone is capable of becoming the coordinating device, or primary device of the bonded zone.

Figure 13A:
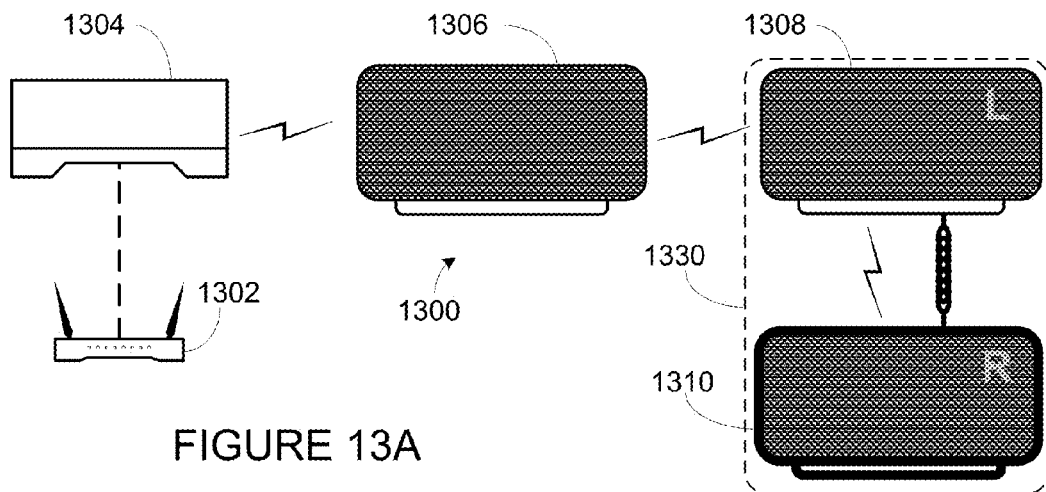
FIGS. 13A-C shows a series of example coordinator device configurations for multichannel playback.

FIG. 13A shows an example media playback system 1300 including a router 1302, and media devices 1304, 1306, 1308, and 1310. As shown, media device 1304 may be coupled to the router 1302 via a direct connection (such as, for example, a wired Ethernet connection), while the media device 1306 may communicate wirelessly with the media device 1304, the media device 1308 may communicate wirelessly with the media device 1306, and the media device 1310 may communicate wirelessly with the media device 1308. Also shown is that media devices 1308 and 1310 may be in a bonded zone 1330, as a left channel speaker and a right channel speaker, respectively. In one case, the media device 1310 and the media device 1308 may be the first playback device and second playback device, respectively referenced above in connection to block 1202 of the method 1200.

In this example, media device 1310 may be a coordinating device or primary player of the bonded zone 1330, such that the media device 1310 may be configured to receive audio content from an audio source, process the audio content, generate playback timing information, and forward at least a portion of the received audio content and the generated playback timing information to the second playback device during rendering of the audio content by the bonded zone. In this example, if the coordinating or primary media device 1310 is the right channel speaker, the at least a portion of the received audio content provided by the media device 1310 to the media device 1308 may include the left channel component of the audio content. In one case, the coordinating device of a bonded zone may effectively be the audio source of the bonded zone such that each of the other devices in the bonded zone receives media content to be rendered from the coordinating device.

Prior to analyzing the wireless interface performance metric of the first playback device, a determination may first be made indicating that analyses of one or more wireless interface performance metrics associated with the one or more respective playback device in the bonded zone should be performed. Analogous to the triggers for evaluating parameters of playback devices for the purposes of group coordinator selection as discussed above, the determination that the analyses of one or more wireless interface performance metrics may also be based on one or more events, including an addition of a new playback device to the bonded zone (or a creation of a new bonded zone from two or more playback devices), a change in a network topology of the bonded zone (i.e. a root path cost of one of the two or more playback devices in the bonded zone has changed), or a change in the wireless interface performance metric of a playback device in the bonded zone.

Further, analyses of the wireless interface performance metrics of playback devices in the bonded zone may be performed periodically, or may be performed in response a user-input indicating that the analyses should be performed. Further, while discussions for selecting a coordinator device for a bonded zone refers to analyses of the wireless interface performance metric of the playback devices in the bonded zone, other parameters such as root path costs, playback device processor capabilities, and other factors such as those discussed in connection to group coordinator device selections may also be analyzed ad considered when selecting the coordinator device for the bonded zone.

At block 1204, the method 1200 may involve receiving, by the device, a wireless interface performance metric of the second playback device in the bonded zone. In addition to analyzing the wireless interface performance metric of the first playback device (e.g., media device 1310), the wireless interface performance metric of the second playback device (e.g., media device 1308) may also be analyzed. In one example, the wireless interface performance metric of the media device 1308 may be performed by the coordinator media device 1310 of the bonded zone 1330. In another example, the wireless interface performance metric of the media device 1308 may be performed by the media device 1308 and results of the analysis may be provided to the coordinator media device 1310. Other examples are possible as well.

At block 1206, the method 1200 may involve comparing the wireless interface performance metric of the first playback device against the wireless interface performance metric of the second playback device. As suggested above, if a coordinator device of the bonded zone 1330 is to be selected based on the wireless interface performance metric of playback devices in the bonded zone 1330, then the wireless interface performance metric of the media device 1308 should be compared against the wireless interface performance metric of the media device 1310, and any other playback devices in the bonded zone 1330.

At block 1208, the method 1200 may involve selecting one of the first playback device, and the second playback device as a coordinator device. Referring back to the media playback system 1300 of FIG. 13A, if the comparisons made in block 1206 indicate that the wireless interface performance metric of media device 1310 is higher than the wireless interface performance metric of the media device 1308, the media device 1310 may be selected or in some cases re-selected as the coordinator device for the bonded zone 1330. On the other hand, if the comparisons made in block 1206 indicate that the wireless interface performance metric of media device 1308 is higher than the wireless interface performance metric of the media device 1310, the media device 1308 be selected as the coordinator device for the bonded zone 1330.

At block 1210, the method 1200 may involve causing the selected playback device to become the primary device of the bonded zone. As indicated previously, the selected playback device may be configured to receive the audio content from the audio source, and forward at least a portion of the received audio content to the other playback devices in the bonded zone during rendering of the audio content by the bonded zone.

In the case media device 1310 is the selected playback device to become the primary device or coordinator device for the bonded zone 1330, media device 1310 may continue to receive audio content, process the audio content, generate playback timing information, and providing at least a portion (in this case, the left channel audio component) of the audio content to media device 1308 for rendering multi-channel audio content in synchrony.

On the other hand, if media device 1308 is the selected playback device to become the primary device or coordinator device for the bonded zone 1330, media device 1308 may be configured to receive audio content, process the audio content, generate playback timing information, and providing at least a portion (in this case, the right channel audio component) of the audio content to media device 1310 for rendering multi-channel audio content in synchrony.

Figure 13B:
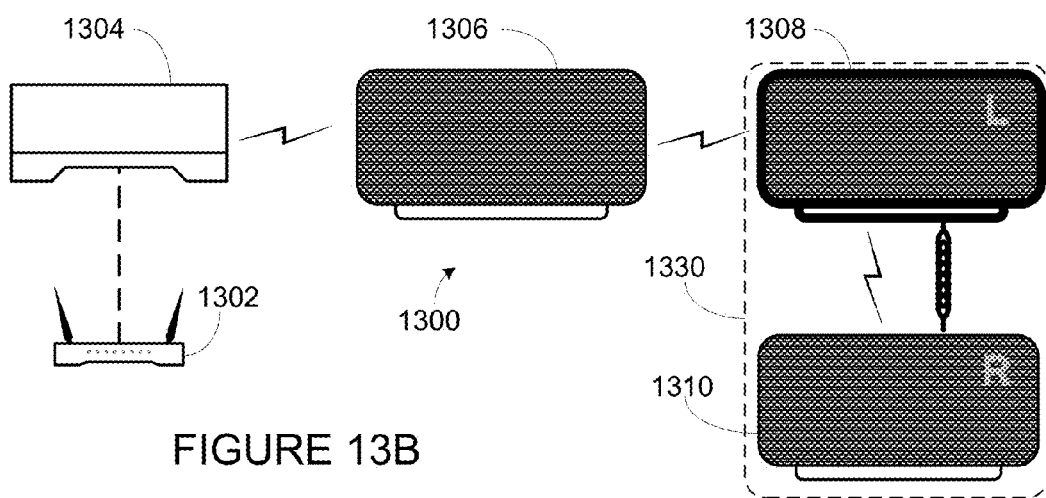

Complimentarily, media device 1310 may be configured to stop receiving audio content from the audio source, stop providing any audio content to media device 1308, and begin receiving at least a portion (in this case, the right channel component) of the audio content from media device 1308 for rendering multi-channel audio content in synchrony. FIG. 13B shows the media playback system 1300 with a bonded zone 1330 of media device 1308 and 1310 configured to play the left channel audio component and right channel audio component, respectively, in synchrony.

As with the case discussed above relating to group coordination device selection, if the selected playback device is different from the previous coordinator device, such as if the media device 1308 is replacing the media device 1310 as the coordinator device of the bonded zone 1330, the transition may be configured to occur between playback of media content so as not to disrupt or affect the playback of media content by the bonded zone 1330. Other examples are also possible.

Figure 13C:
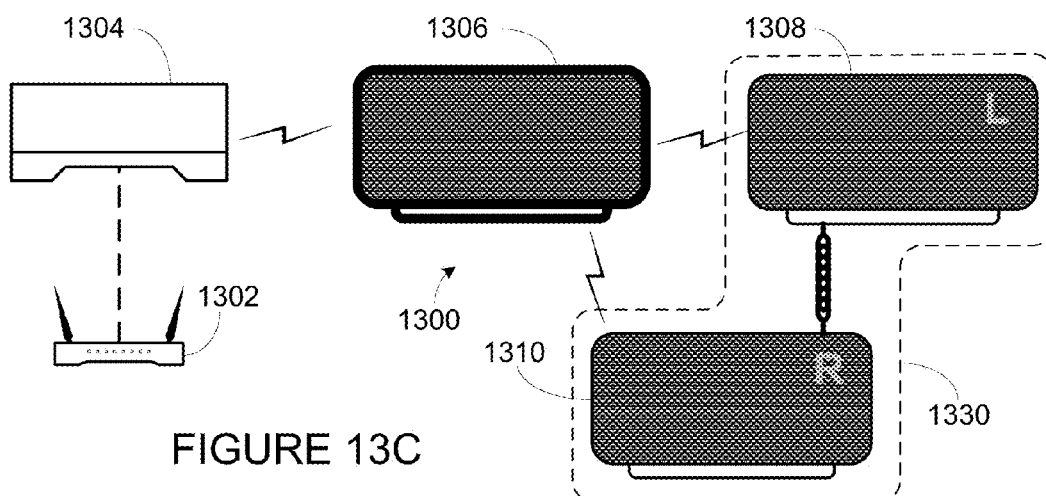

While the examples provided herein may suggest that a coordinator device for a bonded zone may be selected only from among media devices in the bonded zone, one having ordinary skill in the art will appreciate that a device in the media playback system that is not in the bonded may be also selected as the coordinator device for the bonded zone. FIG. 13C shows an example configuration of the media playback system 1300. In this configuration, the media device 1308 and the media device 1310 may in the bonded zone 1330 and may both be in communication with media device 1306. In such a case, depending on various factors as suggested above, the media device 1306 may be the most suitable coordinator device for the bonded zone 1330, while not being in the bonded zone 1330 itself. Other examples are also possible.

IX. CONCLUSION

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application involves selecting a group coordinator device for a media playback system of a plurality of media devices. In one aspect, a method is provided. The method involves establishing a group of one or more devices in a media playback system. The one or more devices are configured to render audio content in synchrony, and a first device of the one or more devices in the media playback system is a group coordinator configured to provide audio content data and audio content playback timing information to other devices in the group. The method further involves performing an evaluation of one or more parameters associated with the one or more devices in the media playback system, based on the evaluation, determining that a second device in the one or more devices in the media playback system is to be the group coordinator, and causing the second device to become the group coordinator of the group of one or more devices in the media playback system.

In another aspect, a network device is provided. The network device includes a processor, and memory having stored thereon instructions executable by the processor to cause the network device to perform functions. The functions include establishing a group of one or more devices in a media playback system. The one or more devices are configured to render audio content in synchrony, and a first device of the one or more devices in the media playback system is a group coordinator configured to provide audio content data and audio content playback timing information to other devices in the group. The functions further include performing an evaluation of one or more parameters associated with the one or more devices in the media playback system, based on the evaluation, determining that a second device in the one or more devices in the media playback system is to be the group coordinator, and causing the second device to become the group coordinator of the group of one or more devices in the media playback system.

In yet another aspect, a non-transitory computer readable memory is provided. The non-transitory computer readable memory has stored thereon instructions executable by a computing device to cause the computing device to perform functions. The functions include establishing a group of one or more devices in a media playback system. The one or more devices are configured to render audio content in synchrony, and a first device of the one or more devices in the media playback system is a group coordinator configured to provide audio content data and audio content playback timing information to other devices in the group. The functions further include performing an evaluation of one or more parameters associated with the one or more devices in the media playback system, based on the evaluation, determining that a second device in the one or more devices in the media playback system is to be the group coordinator, and causing the second device to become the group coordinator of the group of one or more devices in the media playback system.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

I claim:

1. In a media playback system comprising a plurality of playback devices that are interconnected in a spanning tree configuration, a method comprising:
   detecting, via a device, a modification to a group of playback devices, wherein modifying the group comprises one of: (a) adding a playback device to the group, or (b) removing a playback device from the group, and wherein the group of playback devices is configured to play back media from a media device;
   performing, via the device, an evaluation of one or more parameters associated with one or more of the plurality of playback devices including at least the modified group of playback devices, wherein performing the evaluation of one or more parameters comprises determining respective root path costs along the spanning tree configuration from the media device to the playback devices;
   identifying, via the device, a given playback device of the group to be group coordinator for the group based on the relative root path cost of the given playback device to the determined root path costs, wherein the group coordinator provides, to other playback devices of the group, audio content data and audio content playback timing information to synchronize playback by the group of playback devices; and
   causing, by the device, the given playback device to become the group coordinator of the group.

2. The method of claim 1, wherein the device is group coordinator for the group prior to causing the given playback device to become the group coordinator of the group.

3. The method of claim 2, wherein the device comprises a playback device, and wherein the group include the device and the given playback device.

4. The method of claim 1, wherein causing the given playback device to become the group coordinator of the group comprises:
   determining a suitable time interval during which to cause the given playback device to become the group coordinator; and
   causing the given playback device to become the group coordinator of the group during the determined suitable time interval.

5. The method of claim 4, wherein causing the given playback device to become the group coordinator of the group during the determined suitable time interval comprises causing the given playback device to become the group coordinator of the group after playback of a currently played first audio content and before playback of a subsequent second audio content by the group of playback devices.

6. The method of claim 5, wherein causing the given playback device to become the group coordinator of the group comprises:
   determining that rendering of audio content by the group of playback devices has stopped; and
   based on determining that rendering of audio content by the group of playback devices has stopped, causing the given playback device to become the group coordinator of the group of playback devices in the media playback system.

7. The method of claim 1, further comprising:
   causing at least the one or more parameters associated with the group of playback devices and the evaluation of the one or more parameters associated with the group of playback devices in the media system to be stored on the given playback device.

8. The method of claim 1, further comprising:
   causing at least the one or more parameters associated with the group of playback devices in the media system and the evaluation of the one or more parameters associated with the group of playback devices in the media system to be stored on at least one of the group of playback devices in the media system.

9. The method of claim 1, wherein performing the evaluation of one or more parameters further comprises determining respective computing capabilities of the playback devices and wherein identifying the given playback device of the group to be group coordinator for the group comprises identifying the given playback device based on the relatively greater computing capability of the given playback device to the determined computing capabilities of the playback devices.

10. The method of claim 1, wherein performing the evaluation of one or more parameters further comprises determining respective communications capabilities of the playback devices and wherein identifying the given playback device of the group to be group coordinator for the group comprises identifying the given playback device based on the relatively greater communications capability of the given playback device to the determined communications capabilities of the playback devices.

11. The method of claim 1, wherein adding the playback device to the group comprises combining a first zone that comprises a first playback device and a second zone that comprises a second playback device into a zone group and wherein removing a playback device from the group comprises removing at least one of the first zone or the second zone from the zone group.

12. The method of claim 1, wherein the media device is a first media device, and wherein modifying the group comprises causing the group of playback devices to play back media from a second media device.

13. A network device in a media playback system comprising a plurality of devices that are interconnected in a spanning tree configuration, the network device comprising:
   a processor; and
   memory having stored thereon instructions executable by the processor to cause the network device to perform functions comprising:
   detecting a modification to a group of playback devices, wherein modifying the group comprises one of: (a) adding a playback device to the group, or (b) removing a playback device from the group, and wherein the group of playback devices is configured to play back media from a media device;
   performing an evaluation of one or more parameters associated with one or more of the plurality of playback devices including at least the modified group of playback devices, wherein performing the evaluation of one or more parameters comprises determining respective root path costs along the spanning tree configuration from the media device to the playback devices;

identifying a given playback device of the group to be group coordinator for the group based on the relative root path cost of the given playback device to the determined root path costs, wherein the group coordinator provides, to other playback devices of the group, audio content data and audio content playback timing information to synchronize playback by the group of playback devices; and causing the given playback device to become the group coordinator of the group.

14. The network device of claim 13, wherein the network device is group coordinator for the group prior to causing the given playback device to become the group coordinator of the group.

15. The network device of claim 13, wherein the network device comprises a playback device, and wherein the group include the network device and the given playback device.

16. The network device of claim 13, wherein adding the playback device to the group comprises combining a first zone that comprises a first playback device and a second zone that comprises a second playback device into a zone group and wherein removing a playback device from the group comprises removing at least one of the first zone or the second zone from the zone group.

17. A non-transitory computer readable medium having stored thereon instructions executable by a computing device in communication with a media playback system comprising a plurality of devices that are interconnected in a spanning tree configuration, wherein the instructions are executable by the computing device to cause the computing device to perform functions comprising:

detecting a modification to a group of playback devices, wherein modifying the group comprises one of: (a) adding a playback device to the group, or (b) removing a playback device from the group, and wherein the group of playback devices is configured to play back media from a media device;

performing an evaluation of one or more parameters associated with one or more of the plurality of playback devices including at least the modified group of playback devices, wherein performing the evaluation of one or more parameters comprises determining respective root path costs along the spanning tree configuration from the media device to the playback devices;

identifying, via the device, a given playback device of the group to be group coordinator for the group based on the relative root path cost of the given playback device to the determined root path costs, wherein the group coordinator provides, to other playback devices of the group, audio content data and audio content playback timing information to synchronize playback by the group of playback devices; and causing the given playback device to become the group coordinator of the group.

18. The non-transitory computer readable medium of claim 17, wherein causing the given playback device to become the group coordinator of the group comprises:

determining a suitable time interval during which to cause the given playback device to become the group coordinator; and causing the given playback device to become the group coordinator of the group during the determined suitable time interval.

19. The non-transitory computer readable medium of claim 18, wherein causing the second device to become the group coordinator of the group during the determined suitable time interval comprises causing the given playback device to become the group coordinator of the group after playback of a currently played first audio content and before playback of a subsequent second audio content by the group of playback devices.

20. The non-transitory computer readable medium of claim 17, wherein the functions further comprise:

causing at least the one or more parameters associated with the one or more playback devices in the media system and the evaluation of the one or more parameters associated with the one or more playback devices in the media system to be stored on the given playback device.

* * * * *